INVENTOR.
Kenneth O. Sisson
BY Frederick M. Ritchie
His Attorney

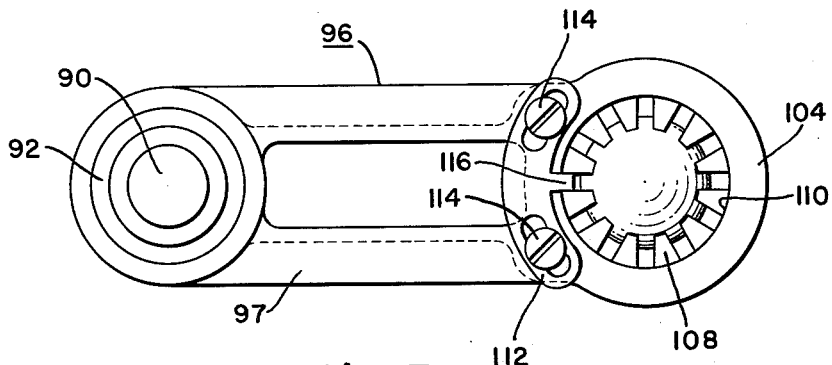
Fig. 3
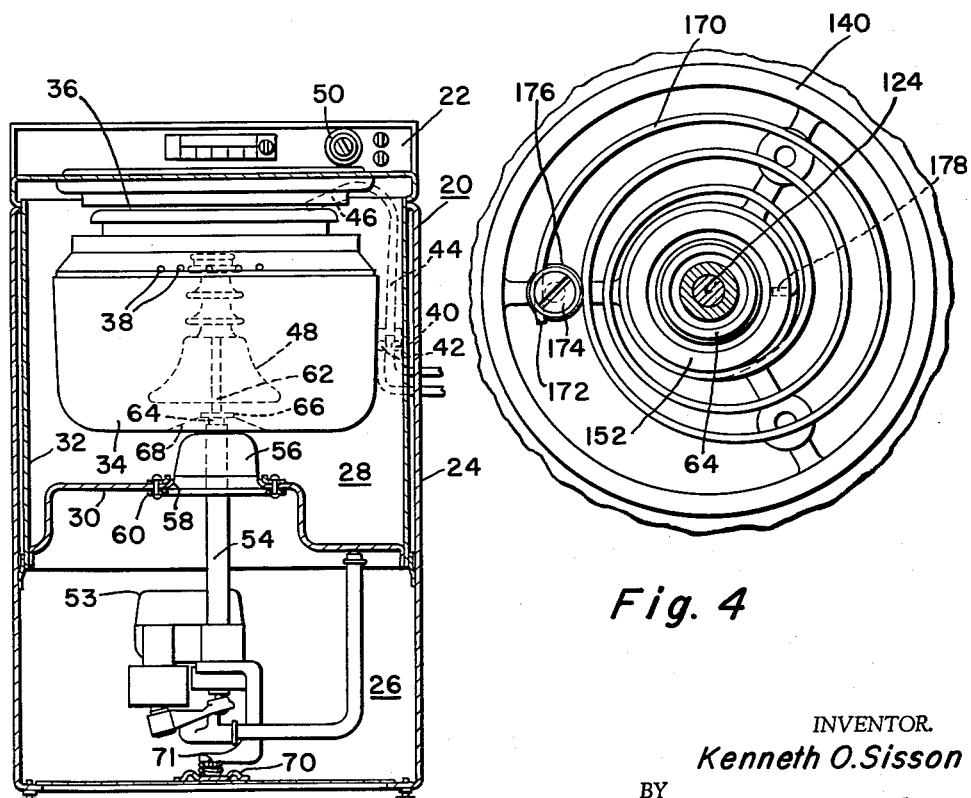
Fig. 4
Fig. 2
INVENTOR.
Kenneth O. Sisson
BY
Frederick M. Ritchie
His Attorney INVENTOR.
Kenneth O. Sisson
BY Frederick M. Ritchie
His Attorney United States Patent Office 3,060,712
Patented Oct. 30, 1962

1

3,060,712
WASHING MACHINE HAVING AN AGITATE DRIVE WITH A FLEXIBLE COUPLING AND A SPIN DRIVE WITH A BRAKE INITIATING MEANS
Kenneth O. Sisson, Dayton, Ohio, assignor to General Motors Corporation, Detroit, Mich., a corporation of Delaware
Filed July 31, 1961, Ser. No. 128,233
3 Claims. (Cl. 68—23)

This invention relates to a domestic appliance and more particularly to an improved dry-type roller drive prime mover system for an agitating and spinning mechanism in a clothes washer.

A dry-type agitate and spinning mechanism for a clothes washer is set forth in copending application Ser. No. 5,174, filed January 28, 1960, and assigned to the same assignee as this invention. In this copending case a roller drive mechanism is taught in which oil bath lubrication is eliminated and replaced with torque transmitting rollers to selectively rotate the spin tub in a washer or reciprocate an agitator. In such a prime mover system it is essential that friction and play be minimized wherever possible to hold down noise problems and eliminate wear.

Accordingly, it is an object of this invention to provide a noise-free flexible coupling between the agitate shaft of an agitate and spin mechanism and the means for actuating said agitate shaft.

More specifically, it is an object of this invention to provide a roller drive mechanism having a rocker for reciprocating a shaft with a flexible coupling to compensate for the arcuate movement of the rocker.

Further objects and advantages of the present invention will be apparent from the following description, reference being had to the accompanying drawings wherein preferred embodiments of the present invention are clearly shown.

In the drawings:

FIGURE 2 is a schematic sectional view partly in elevation of a clothes washer provided with the improved dry running type, roller motivated agitating and spinning mechanism of this invention;

FIGURE 3 is a bottom elevational view of the pulsator arm assembly taken along line 3 in FIGURE 1;

FIGURE 4 is a fragmentary sectional view taken along line 4—4 in FIGURE 1 to show a teaser spring in the construction of this invention;

Figure 1:
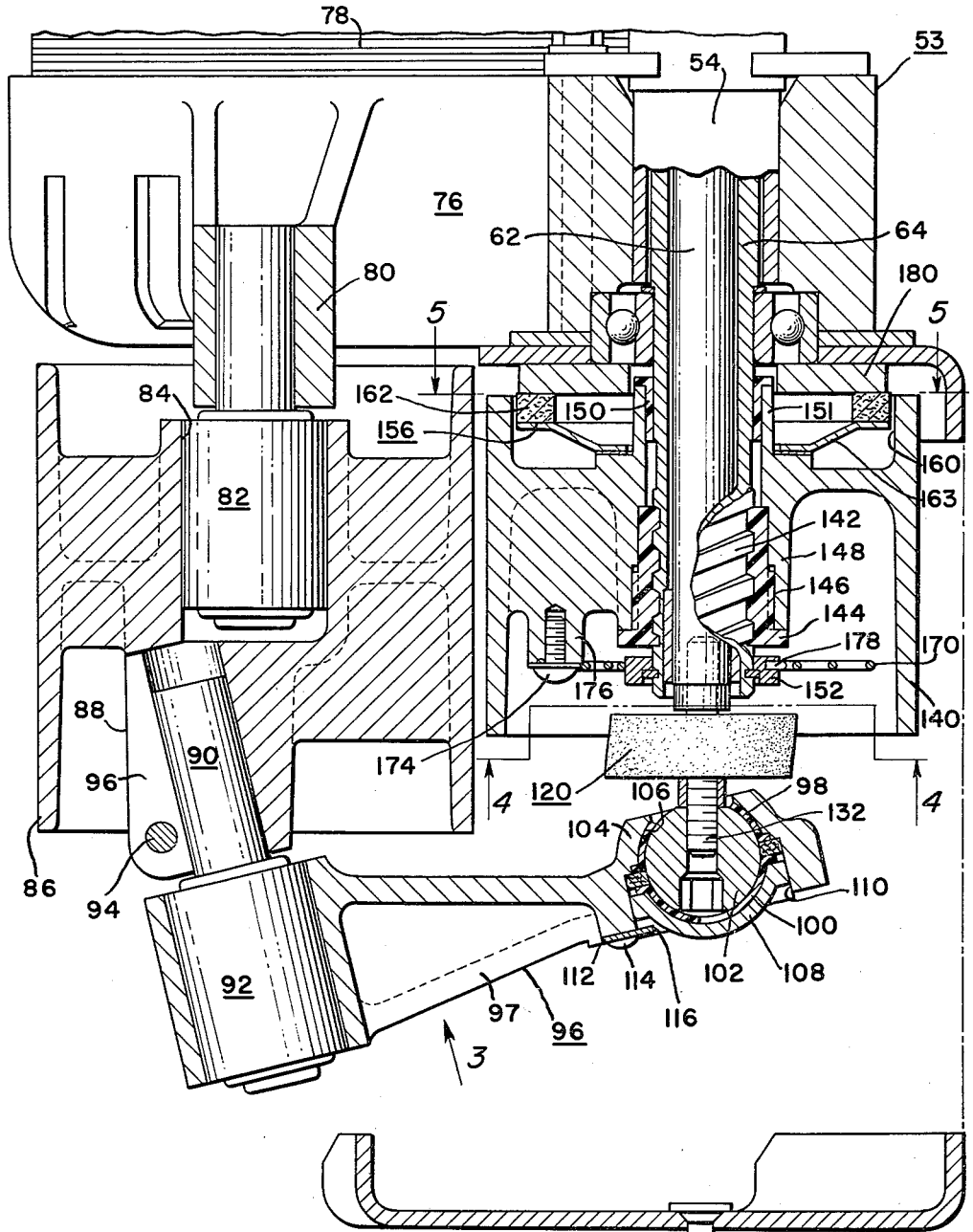
FIGURE 1 is a sectional view of the improved agitate and spin mechanism partly in elevation to show the pulsator arm of this invention in a raised out-of-alignment condition.

In accordance with this invention and with reference to FIGURE 2, a clothes washer 20 is comprised of a control housing portion 22 and a casing 24. The casing 24 is generally divided into a mechanism portion or compartment 26 and a washing portion or water container chamber 28. A generally centrally located bulkhead 30 separates the mechanism compartment 26 from the water container chamber 28 which is further bounded by a cylindrical water container wall 32. Within the water container 32 is a spin tub 34 having a top opening 36 and a plurality of centrifuging outflow ports 38. The ports 38 are designed to permit the egress of water from the tub 34 when the tub is rotated at high speed. For filling the tub 34 with water, a conventional water supply system may be provided with a hot water solenoid actuated valve 40 and a cold water solenoid operated valve 42 which are manifolded into a mixed water supply conduit 44 terminating at a chute 46 overlying the opening 36 of the tub 34. Within the tub 34, an agitator or pulsator 48 is adapted to reciprocate to circulate or agitate the water admitted through the water supply conduit 44. Thus, clothing placed within the tub 34 is washed as the agitating action of the pulsator 48 causes surging currents of washing fluid and detergent through the fabric. Conventional sequential operating timer means, shown generally at 50 on the control housing 22, may be included to selectively admit water through the supply conduit 44, to spin the tub 34 and to vertically reciprocate the agitator or pulsator 48.

In the prior art, mechanisms for selectively spinning tub 34 and reciprocating an agitator 48 were rather complex and required lubrication of the many parts required to set up the desired washing operation. This invention is directed to an improved dry-running roller type agitating and spinning mechanism of the type taught in the aforementioned copending application Ser. No. 5,174 and shown generally in FIGURE 2 as 53. The mechanism 53 is suspended from a stationary shaft enclosing housing portion 54 which is connected to a resilient cup-shaped support member 56. The support member 56, in turn, is affixed to an opening 58 in the bulkhead 30—sealing gasket 60 being provided to effect a water-tight connection. Extending upwardly from the stationary enclosing housing 54 is an agitate or pulsate shaft 62 to which the agitator 48 is connected and a spin shaft 64 which is connected as by a tub support nut 66 to the bottom wall 68 of the spin tub 34. In order to dampen excessive gyrating or swinging movement of the agitate and spin mechanism's lower end, a snubber device, shown generally at 70, is included to receive the snubbing stud 71. For further details pertaining to the overall operation of the roller drive type mechanism, reference may be had to the aforementioned copending application.

With reference now to FIGURES 1 and 3, the mechanism portions pertaining to agitation will now be described. The mechanism 53 is provided with a support portion 76 which encloses a reversible drive motor 78 in an upper portion thereof. A boss 80 formed on the support housing 76 serves to carry in press-fit relationship an elongated double or water pump bearing 82 which is press-fit into a center opening 84 of an agitate drum 86. A drive pinion (not shown) serves to rotate the agitate drum 86 through an idler roller (not shown) whenever the operational direction of motor 78 is such as to set up an agitate action. Further, the agitate drum 86 is formed with a crank portion 88 which is split to receive a shaft 90 of another water pump bearing 92—a bolt 94 serving to squeeze adjacent portions 96 of the split crank portion together to retain the bearing shaft 90. Thus, whenever the agitate drum 86 is rotated, the bearing shaft 90 and thus the bearing 92 precesses about the axis of the agitate drum bearing 82.

To translate the rotative motion of the agitate drum 86 into the vertical reciprocation of the agitate shaft 62, an aluminum die cast pulsator arm or rocker arm assembly 96 has an arm 97 which is press fit onto and carried by the bearing 92. The pulsator arm assembly is further comprised of spherically configured upper and lower ball joint liners 98, 100 of Delrin or other suitable plastic material and a spherical ball bearing 102 of sintered iron or equivalent held in sandwiched relationship between the ball joint liners 98 and 100. Note that the end 104 of the pulsator arm 97 is formed with a spherical inner wall 106 for receiving and uniformly supporting the liner 98. In order to retain the ball joint assembly within the end of the pulsator arm, a pulsator arm cap 108 is threadedly received in a tapped opening 110 on the bottom side of the pulsator arm. This cap 108 is castellated and adapted to screw into the tapped opening 110 until the desired amount of compression on the spherical bearing 102 is obtained. When satisfactory retention pressure is achieved, a lock plate 112 is fastened as by bolts 114 to the pulsator arm—a tab 116 interfitting with one of the castellations to prevent the pulsator arm cap 108 from unscrewing and relieving compression on the ball joint.

Figure 6:
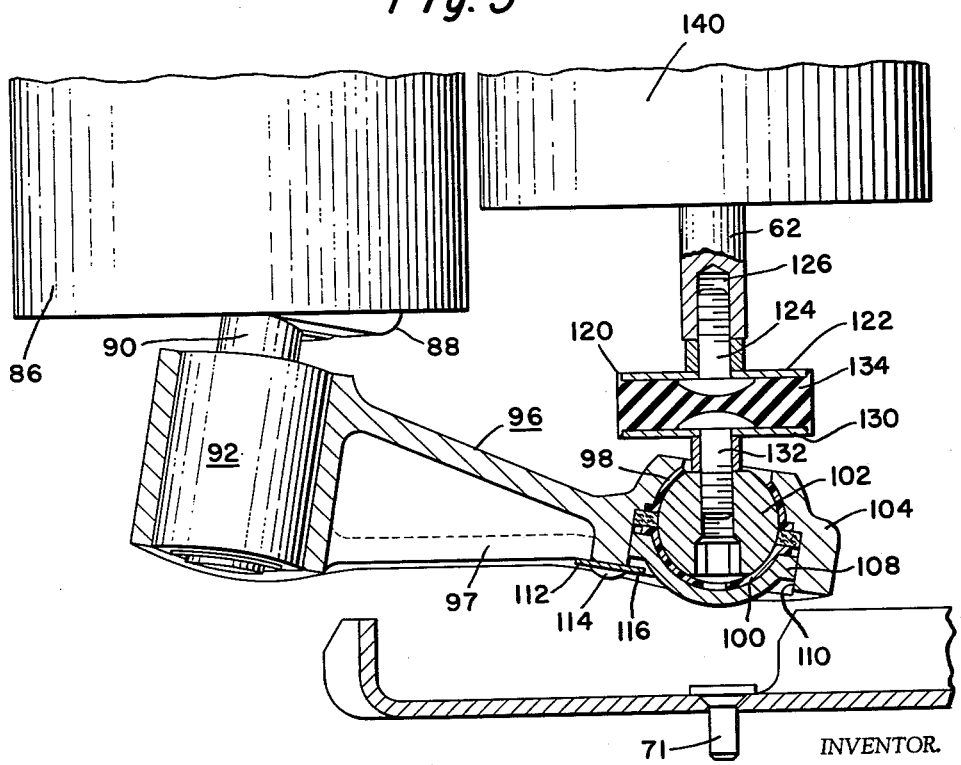
FIGURE 6 is a sectional view partly in elevation of the pulsator arm in a central aligned condition.

The improved flexible connection between the pulsator arm assembly 96 and the agitate shaft 62 is best seen in FIGURES 1 and 6. It should be understood that a rocking motion created by the rotation of the agitate drum 86 will cause the agitate end 104 of the pulsator arm 97 to move through a slight arc. Thus, the center of the spherical bearing 102 will be axially out of alignment periodically with the agitate shaft 62. In FIGURE 1 the pulsator arm assembly is shown in its uppermost out-of-alignment position whereas FIGURE 6 depicts the pulsator arm assembly in its centermost position wherein the spherical bearing 102 is axially in line with the agitate shaft 62.

To compensate for the arcing movement of the pulsator arm assembly, an elaborate support arrangement for a shifting spherical bearing was taught in the copending application. This was not only noisy but was subjected to undue wear and was costly to manufacture. The problem involved the yieldable bearing retainer rings. They were weak in the vertical direction—a fact which caused the rings to alternately pull away from the spherical bearing as the shaft was reciprocated, thereby causing a slapping or knocking noise. But when enough rubber thickness was added to these retainer rings to overcome the slapping noise, the spherical bearing was held too firmly and power requirements on the motor were adversely increased.

This invention is directed to an improved and simplified connection between the agitate shaft 62 and the pulsator arm assembly in that a flexible or yieldable mount 120 is interposed between the pulsator arm and the agitate shaft. With reference to FIGURE 6, the mount is comprised of a circular plate 122 having affixed thereto a bolt portion 124 which interfits with a tapped opening 126 in the bottom of the agitate shaft. In spaced relation to the plate 122 is an identical plate 130 which includes a bolt portion 132 threadedly engaged with the spherical bearing 102. A yieldable material such as rubber 134 is interposed in sandwiched relationship between the plates 122 and 130 and bonded thereto such that motion is freely transmitted between the pulsator arm assembly 96 and the agitate shaft 62. By warping and flexing, the mount 120 compensates for all arcuate movement of the extending end of the pulsator arm 97.

Figure 5:
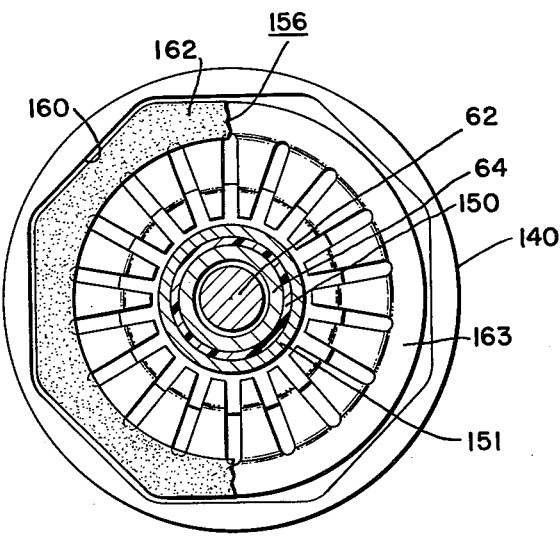
FIGURE 5 is a sectional view taken along 5—5 in FIGURE 1 to show the braking arrangement.

The improved braking system of this invention will now be described with reference to FIGURES 1, 4 and 5. In accordance with the teachings of the aforementioned copending application and my copending application Ser. No. 128,074 filed concurrently herewith, a spin drum 140 is adapted to be driven through a drive pinion and idler (not shown) of the motor 78. A portion of the spin shaft 64 extends below the support housing 54 and has a threaded portion 142 on the lower end thereof for threadedly receiving a spin drum bushing 144 of Delrin plastic or other suitable material. The bushing 144 is splined on its outer periphery as at 146 to engage complementary splines on a depending hub portion 148 of the spin drum 140. A plastic bushing 150 interfits with the upwardly extending hub portion 151 of the spin drum 140 and serves as a bearing between the spin shaft 64 and the spin drum hub 151. With a stop 152 keyed against relative rotation to the lower end of the spin shaft 64, it can be seen that the spin drum 140 is shiftable axially between an upper and a lower position as it rotates on the spin shaft threads 142. The spin drum moves between a lowermost position wherein the spin drum bushing 144 engages the stop 152 and an upper position wherein a braking system 156 is actuated.

The upper end of the spin drum 140 is formed with an inner octagonal surface 160 which mates with an interfitting frictional material brake plate 162 supported by and affixed to a spring washer 163. Thus, the brake plate 162 as relates to the spin drum is permitted relative axial movement while relative rotative motion is prevented.

Briefly, the braking system 156 operates as follows. During spin, the spin drum 140 is driven from the motor 78 in a direction to cause it to screw downwardly on the threads 142 of the spin shaft until the spin drum bushing 144 seats on the stop 152. As soon as the spin drum is seated, a positive connection is effected between the spin drum and the spin shaft and the spin tub 34 is in rotatable drive connection with the motor 78. At the conclusion of spin, the inertia of the tub and spin shaft is generally greater than that of the motor and spin drum 140—a fact which causes the spin shaft to overrun the decelerating spin drum 140 so that the spin drum will screw itself upwardly to press the brake plate against the stationary disc 180 and actuate the braking system 156. This operation is explained more fully in the copending application Ser. No. 5,174.

To overcoming a problem which occurs occasionally at the conclusion of a spin cycle, a teaser spring 170 is used. There exists the possibility in a smoothly running mechanism with a minimum friction between the spin drum 140 and the motor 78 that the tub, the spin drum and the motor will continue to rotate freely, i.e., no relative motion to start the braking action promptly. To overcome this problem, a brake actuator spring or teaser torque spring 170 of music wire or other suitable yieldable material is positioned in the hollow lower end of the spin drum having its one end 172 retained as by a screw 174 in a boss 176 of the spin drum. At the other end of the spiral configuration, a hooked portion 178 is interlocked with the stop member 152 keyed to the spin shaft. The spring is wrapped to exert a torque which will cause the spin drum 140 to screw itself upwardly to actuate the braking mechanism 156. Whenever the drive motor 78 is operating to spin the tub 34 through the spin drum 140, the torque exerted by the prime mover system at spin speed will be just sufficient to counterbalance the torque exerted by the spring 170. Thus, the frictional material 162 is urged in or teased into a lightly engaging relationship with the brake disc 180. It should be noted that the friction is not sufficient to impair in any way the driving relationship between the motor and the spin shaft, but it is sufficient to cause the braking system to be actuated immediately upon termination of motor driven spin. Further details pertaining to this improved brake system are found in my copending application Ser. No. 128,074.

It should now be seen that an improved yieldable connecting arrangement has been provided in a vertically reciprocating type of roller drive mechanism. Such an arrangement compensates for slight variations in arcuate movement inherent in such a system and is effective to provide a quiet, low cost trouble-free combination.

While the embodiments of the present invention as herein disclosed constitute preferred forms, it is to be understood that other forms might be adopted.

What is claimed is as follows:

1. In combination with an agitator and a spin tub, means for moving said agitator and rotating said tub, said means comprising a stationary support member, a motor carried by said support member, an agitate shaft connected to said agitator at the top thereof and having a yieldable portion at the bottom thereof, a spin shaft concentric with said agitate shaft and connected to said spin tub, an agitate drum rotatably supported on said support member and having an angularly directed crank means, a spin drum, means on said spin shaft for supporting said spin drum for movement relatively axially to said spin shaft between first and second positions, a pulsator arm assembly having a rocking end universally movably connected to said yieldable portion and a crank end relatively rotatably connected to said crank means, said motor adapted to operate in a first direction while drivably connected to said agitate drum for moving said agitator and adapted to operate in a second direction while drivably connected to said spin drum for rotating said spin tub, said agitate drum rotating said crank end to cause said rocking end to move through an arc which flexes said yieldable portion when said motor is adapted for operating in said first direction, said spin drum moving to said first position to drive said spin shaft when said motor is adapted for operating in said second direction, brake means responsive to the relative axial movement of said spin drum to said second position for stopping said spin tub when the operation of said motor in said second direction is terminated, and resilient means including a torque spring having one end connected for movement with said spin shaft and its other end connected for movement with said spin drum, said torque spring being wound around said spin shaft in a manner to exert a torque between said spin shaft and said spin drum for initiating said relative axial movement promptly at the termination of said motor operation in said second direction.

2. In combination with an agitator and a spin tub, means for moving said agitator and rotating said tub, said means comprising a stationary support member, a motor carried by said support member, an agitate shaft connected to said agitator at the top thereof and having a yieldable portion at the bottom thereof, a spin shaft concentric with said agitate shaft and connected to said spin tub, an agitate drum rotatably supported on said support member and having an angularly directed crank means, a spin drum, means on said spin shaft for supporting said spin drum for movement relatively axially to said spin shaft between driving and braking positions, a pulsator arm assembly having a rocking end universally movably connected to said yieldable portion and a crank end relatively rotatably connected to said crank means, said motor adapted to operate in a first direction while drivably connected to said agitate drum for moving said agitator and adapted to operate in a second direction while drivably connected to said spin drum for rotating said spin tub, said agitate drum rotating said crank end to cause said rocking end to move through an arc which flexes said yieldable portion when said within is adapted for operating in said first direction, said spin drum moving to said driving position to drive said spin shaft when said motor is adapted for operating in said second direction, and resilient means including a torque spring having one end connected for movement with said spin shaft and its other end connected for movement with said spin drum, said torque spring being wound around said spin shaft in a manner to exert a torque between said spin shaft and said spin drum for urging said spin drum to said braking position promptly at the termination of said motor operation in said second direction.

3. A prime moving system for a clothes washer having a vertically reciprocable agitator shaft comprising an agitate drum rotatable about a fixed axis parallel to the axis of said agitator shaft and a crank portion having an axis at an angle to the axis of said drum, means for rotating said agitate drum, a pulsator arm assembly for translating the rotation of said agitate drum into the reciprocation of said agitator shaft, said pulsator arm assembly having an arm portion and first and second bearings at opposite ends of said arm portion, said first bearing having a shaft portion perpendicular to said arm portion and carried by said crank portion, whereby said second bearing moves through an arc which intersects the axis of said agitator shaft when said agitate drum is rotated and said arm is prevented from rotating, and a yieldable mount having an upper stud threadedly connected to said agitate shaft, a lower stud threadedly connected to said second bearing and rubber bonded therebetween for compensating for said arcuate movement of said second bearing.

References Cited in the file of this patent
UNITED STATES PATENTS 2,346,152    Clark _____ Apr. 11, 1944
2,561,000    Van Weenen et al. _____ July 17, 1951